S. T. MARYE.
CODE OR CIPHER TRANSCRIBING AND TRANSLATING MECHANISM.
APPLICATION FILED JAN. 19, 1910.

1,201,486.

Patented Oct. 17, 1916.

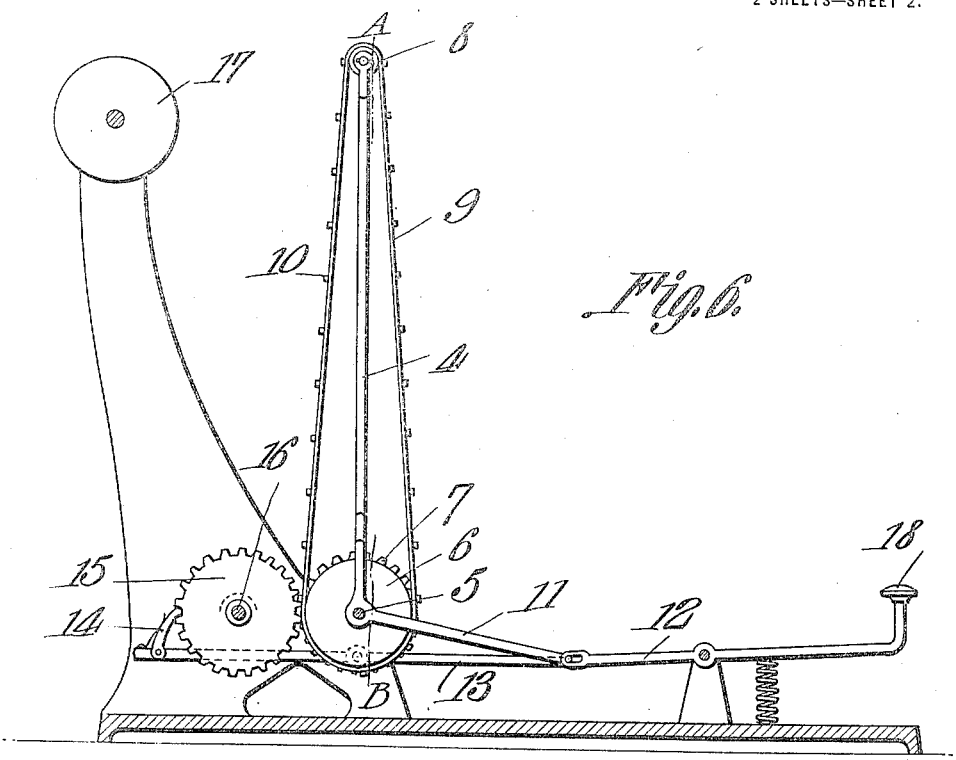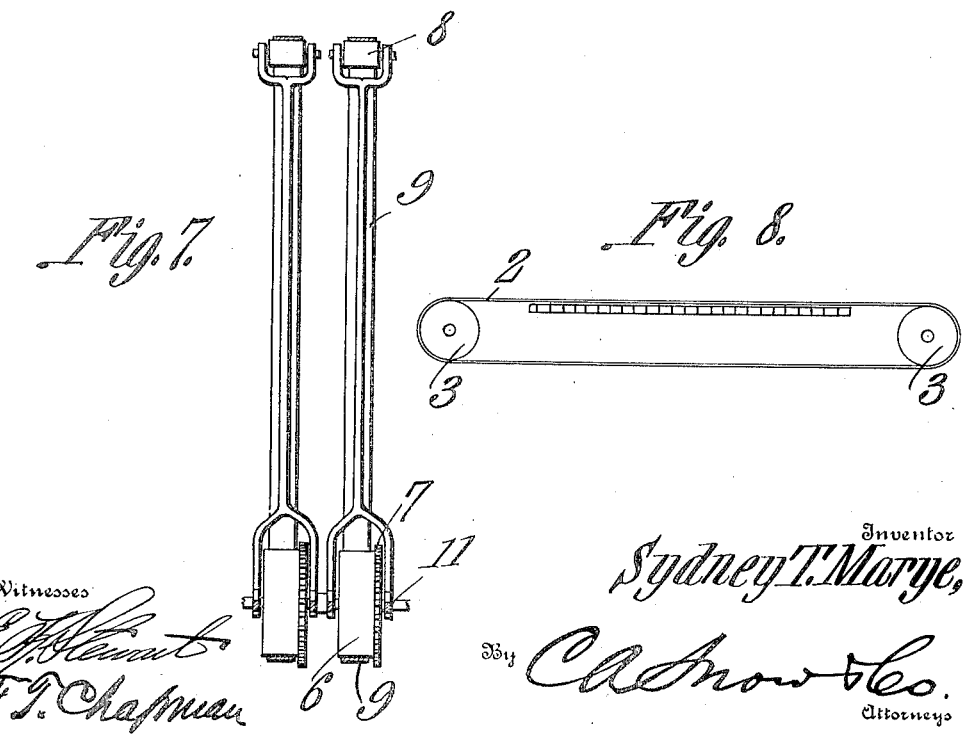

UNITED STATES PATENT OFFICE.

SYDNEY T. MARYE, OF BARCROFT, VIRGINIA.

CODE OR CIPHER TRANSCRIBING AND TRANSLATING MECHANISM.

1,201,486.   Specification of Letters Patent.   Patented Oct. 17, 1916.

Application filed January 19, 1910. Serial No. 538,901.

*To all whom it may concern:*

Be it known that I, SYDNEY T. MARYE, a citizen of the United States, residing at Barcroft, in the county of Alexandria and State of Virginia, have invented a new and useful Code or Cipher Transcribing and Translating Mechanism, of which the following is a specification.

This invention has reference to improvements in the method of producing cipher or code writing and is designed to provide a cipher or code by means of which intelligence may be recorded and if desirable transmitted to a distance, but in either instance can be interpreted only by having specific knowledge of the manner of the production of the combinations of characters symbolizing the intelligence to be recorded or transmitted.

In the simplest form of the invention the complete alphabet or so much thereof as may be necessary is utilized and the arrangement of the letters of the alphabet may be in any order desired.

The practical embodiment of the invention contemplates an instrument similar to a typewriter for the graphic recording of the chosen letters in the order of writing; but the written letters will not be those representing words of any language, the letters appearing in the code words having no fixed relation to the letters appearing in intelligible words which are reproduced in the code words.

In accordance with the present invention there is a constantly changing relation between the letters of the intelligible words and the letters representing the first named letters in the code words and the ratio of change may continue constant throughout the writing or may at the will of the operator be changed from time to time, but in the absence of knowledge of the character of the change, defying interpretation or discovery by any of the tests applied to cipher or code writings for the interpretation thereof.

The practical operation of the present invention is very simple and to a large extent mechanical, but is susceptible of great complexity without putting an undue burden on either the operator producing the cipher writing or upon the operator interpreting the same provided the second operator be aware of the specific manner of the production of such cipher writing. However because of the constantly varying character of the cipher letters with respect to the letters of the intelligible words being produced in cipher writing and the practically infinite intricacies which may enter into such cipher writing, the interpretation thereof without a knowledge of the specific manner of production of the cipher writing becomes impossible.

The invention is not limited to the use of the letters of the alphabet or to any arrangement thereof, or to any specific characters, but any characters capable of being reproduced in any manner may be employed for the purposes of the present invention, nor is the invention limited in any manner to any specific embodiment thereof.

The invention will be best understood from a consideration of the following detail description taken in connection with the accompanying drawings forming a part of this specification, in which drawings, Figure 1 is a diagram showing the key board and co-acting endless band in displayed relation. Fig. 2 is a view of the endless band displayed. Figs. 3, 4 and 5 are diagrams illustrating the operation of the invention. Fig. 6 is a structural diagram showing one manner of embodying the invention in a practical apparatus. Fig. 7 is a section on the line A—B of Fig. 6 with parts omitted and some parts shown in elevation. Fig. 8 is a diagram showing the relation of an endless band to a key-board in a structure similar to that of Fig. 1.

For convenience of description it will be assumed that the code or cipher is to be used in connection with the English language and that the twenty-six letters of the alphabet, or so many of them as may be necessary, will be used in the production of the cipher writing and in the reproduction of the original words from the cipher writing.

In Fig. 1 there are shown twenty-six keys 1 arranged in two rows although the practical embodiment of the invention is not limited to the use of two rows of keys. Arranged to travel over the keys 1 is an endless band 2 which may be supported at each end of the key-board by rollers 3 capable of movement to feed the band 2 step by step in either direction along the rows of keys each step advancing the band the distance between one, two, or more keys 1 as may be desired. Upon the keys 1 are displayed letters of the alphabet in any desired order of arrangement but with the entire alphabet upon the twenty-six keys in the particular arrangement shown, this arrangement however being susceptible of an almost infinite variety of changes. The keys 1 are assumed to control type levers as in an ordinary typewriter and furthermore it is assumed that the instrument is provided with a paper carriage and letter and line spacing as found in ordinary typewriters.

Upon the band 2 are two longitudinal rows of letters corresponding to the arrangement of letters on the key-board except that the first row of letters on the key-board is immediately followed in the same line with the letters of the second row on the key-board and in the same order, thus including the entire alphabet and this alphabet with the same order of letters as found on the key-board is repeated in the one line as often as necessary. The second line on the band 2 is similar to the first line except that it is displaced longitudinally so that when the letters on the first line of the band 2 correspond to the letters of the first line of the key-board, the second row will have those letters corresponding to the second row of the key-board. The arrangement is such that no matter to what extent the band 2 may be moved longitudinally with relation to the key-board, assuming however that the letters on the band 2 will always overlie the keys 1, there will always be displayed on the band 2 over the keys 1 a complete alphabet whether the letters seen on the band 2 match the letters on the keys 1 or not.

Let it be assumed that the transcribing operator and the interpreting operator each has a machine like the other and that each machine be provided with a key-board and overlying band such as illustrated in Fig. 1 and let it further be assumed that the device will upon the depression of the keys 1 cause the imprinting of the letters displayed on these keys, by suitable type levers, upon paper in the carriage of the machine. The transcribing operator first decides upon a code letter, say the letter D in the first row of the band 2, this row being the one remote from the operator. Let it further be assumed that the operator moves the band 2 until the letter D in the first row overlies the letter M of the key-board, this letter also being in the first row of the key-board. Then the code letter or letters will be D over M. Suppose by way of example that the transcribing operator desires to write the word "the." The letter T overlies the letter H of the key-board and by pressing down upon the letter T on the band 2 the key actuating the "H" type lever will be operted and the letter H will be imprinted on the paper in the typewriter carriage. On the release of the key the band 2 will be moved longitudinally, say toward the left as viewed in the drawings and especially in Fig. 3 a distance equal to the space between two keys of either line of the key-board if such spacing be the one determined upon. This movement of the band 2 may be automatic and take place on the release of the key by a mechanism similar to the letter spacing mechanism of a typewriter. The letters displayed on the band 2 have now been shifted toward the left a letter space with reference to the keys of the key board so that there is established a new relation between the letters of the band 2 and the letters of the key-board. The operator now depresses that portion of the band 2 in its new position where he finds the letter H and since this letter H in the new position of the band 2 overlies the key letter Z, the letter Z will be imprinted on the paper after the letter H which was first impressed thereon, the paper carriage having been fed a letter space in the ordinary manner. On the release of the second key the band 2 will be shifted another space to the left and the letters thereon will then have a still different relation to the key-board. The transcribing operator now depresses that portion of the band 2 where E is found and this causes the actuation of the B key. The transcribing operator has therefore written the word "the" but upon the paper in the carriage of the typewriter there appear the letters H-Z-B. The operation continues in this manner until all the original matter has been reproduced in the code or cipher letters.

The writing itself may be sent by mail or otherwise to a distant point if this be desirable or the letters may be telegraphed or cabled to a distant point or any other means of communication may be used, or the paper may be stored for future use.

If it be desired to translate or decipher the code writing then there is used a machine identical with the transcribing machine and this second machine may be considered as the interpreting machine although either machine may be used for either or both purposes.

The interpreting operator must know the code letters and the extent and direction of shift of the endless band 2. Such information may have been previously communicated or by a system known to the operators may be incorporated in the code or cipher writing. The interpreting operator now adjusts the machine so that the letter M of the band is over the letter D of the key board, this being the reverse of the transcribing arrangement, and the direction of movement of the band 2 will be toward the right, one letter space at a step, instead of toward the left as was the case in the transcribing machine. The interpreting operator now depresses the portion of the band containing the letter H and this will cause the actuation of the T key of the machine. On the release of this key the belt 2 is shifted one space toward the right and the operator then depresses the portion of the belt containing the letter Z which will result in the production of the letter H on the paper in the typewriter carriage. On the release of the second key the band 2 is again shifted one space to the right and then the operator depresses the letter B on the band 2 resulting in the production of the letter E on the paper carried on the typewriter carriage. Should the word "the" occur again in the composition or even occur several times there is but little likelihood of it being represented by the same code or cipher letters because of the shift of the band 2. The same conditions prevail with words having doubled letters or with the same letter occurring two or more times in the word, it being quite possible in a composition of any length that each letter may be at different times in the same composition represented in the code or cipher writing by twenty-six different characters.

In Fig. 3 the relative positions of the band 2 to the key-board in the first machine for the special example given are illustrated and in Fig. 5 the relative positions of the band 2 and the key-board in the interpreting machine are shown.

The transcribing operator may cause the progressive shifting of the band 2 to include two or more letter spaces at each movement within the capacity of the structure, and this movement may be in either direction or may continue in one direction for a time and then the direction of movement be reversed as many times as the operator may will.

The arrangement of the letters on the key-board and band may be changed at any time and as there are twenty-six letters or characters employed the changes which may be made are practically unlimited. The initial or code letter may be any one of the twenty-six code letters over any one of the twenty-six keys of the key-board and therefore several hundred such combinations are possible. This renders the probability of discovering the initial or key letters of the code by accident or design exceedingly remote while the chance of discovering the arrangement of the letters on the key-board is practically infinitesimal. Aside from these two protecting features of the code or cipher writing the manner of shifting the band becomes difficult of discovery in proportion to the complexity of this protecting feature. It will be seen that by various changes in the order of shifting of the band it may be made highly complex, since the shifting may be made in either direction upon the writing of each letter or of each word or of each sentence and this shifting may be in either direction or to different extents or in any combination of these various methods. Furthermore the band may contain letters of the alphabet while the keys or the type levers may have arbitrary characters and the interpreting machine may have the same letters and characters in reverse arrangement. Moreover by retranscribing the code writing on one or more additional machines having different arrangements of letters or characters the complexity of interpretation without full knowledge of the specific manner of the production of the code writing becomes infinite.

The invention is particularly adapted to mechanical embodiments and the transcription and interpretation by authorized operators may be accomplished with a facility and speed approaching the operation of ordinary typewriter machines.

In the practical operation of the method of this invention the band 2 may be actuated either automatically or by hand and the interpretation may be transcribed by means of a machine or may be deciphered directly from imprints of the key-board and the band placed in operative relation so that one part may be moved with relation to the other in the same manner as occurs on the machine, this mode of deciphering having the advantage of making no record.

Instead of providing the machine with a movable band overlying the key-board the structure of Figs. 6 and 7 may be employed, the showing of the drawing however being in most part diagrammatic. In the structure illustrated in Figs. 6 and 7 type levers 4 are shown, each type lever being mounted on a pivot axle or shaft 5 which in turn carries a drum 6 having formed on it at one end or there secured, to it a gear wheel 7. The outer end of each type lever 4 carries a roller and mounted on the drum 6 and roller 8 is an endless band 9 carrying type 10 in number equal to the characters used, these characters being assumed to be twenty-six in number. Each type lever 4 carries a band 9 and upon each band the type 10 representing the twenty-six letters of the alphabet are arranged in the same serial order which order may be any one desired.

In the particular showing of the drawings each type lever 4 has an angle arm 11 extending from the pivot end of the lever and this arm is under the control of a key lever 12 in turn controlling a rock lever 13 carrying a pawl 14 in operative relation to a ratchet or gear wheel 15 in mesh with the gear wheel 7 and mounted on a shaft 16.

The type lever 4 is shown as in position to be moved into engagement with a platen 17 and it will be understood that this platen 17 is to be taken as indicative of any suitable paper carriage such as is commonly used in typewriting machines and capable of movement in the same manner as paper carriages of typewriter machines.

There are assumed to be twenty-six type levers 4 and the bands 9 carried by these type levers are all connected for simultaneous movement through the gear wheels 15 and the shaft 16 to which all these gear wheels are connected. Each band 9 however is so disposed on the type lever that no two like letters are in the same line. Moreover each time a key lever is operated a type of the band 9 of the operated lever will be brought against the paper on the platen 17 in a predetermined plane and then all the bands 9 of all the type levers will be shifted alike. This shifting of the bands 9 is due to the fact that all the drums 6 are connected by the gear wheels 7 and 15 to the common shaft 16 and movement imparted to any one of the gear wheels 15 by its key lever 12 will cause a corresponding shift of all the bands 9 simultaneously.

The operation of the structure indicated in Figs. 6 and 7 is similar to that of the structure of Fig. 1. The key levers 12 have upon their finger pieces indicated at 18 the letters of the alphabet in any desired order while the bands 9 have the letters thereon in the same order and the displacement of the bands 9 one relative to the other is such that some one line along the series of bands will read the same as the arrangement of the letters on the finger pieces 18 while the succeeding lines will have a displacement of the letters in each succeeding line across the series of bands. The machine is set for the initial or code letter as before and then the operator uses the key levers 12 as in an ordinary type-writer while the code or cipher letters are imprinted on the paper, all the bands 9 being simultaneously moved in the direction of their lengths each time a key lever is actuated. The relation of the type on the band 9 and the indications on the key levers 12 therefore remains the same as in the case of the traveling band and keyboard of the structure of Fig. 1. The interpreting operator actuates the machine in the same manner as is the case with the structure of Fig. 1 except that the bands 9 are caused to move in the reverse direction to that of the transcribing machine of the operator producing the code or cipher writing. The machine of Figs. 6 and 7 is susceptible of the same variety of operations as has been described with reference to the structure of Fig. 1.

The method of this invention may be utilized for the production in code or cipher writing of intelligible words, that is words such as may be read and understood by any person educated in the language of which the words form a part, or words, symbols, contractions or the like forming a part of a code, cipher or secret writing intelligible to those aware of the same. It is understood therefore that for the purposes of this case any word, symbol, contraction or the like to be converted into a code or cipher writing by the method disclosed herein is to be considered as an intelligible word.

What is claimed is:—

1. A code or cipher writing mechanism, comprising a typing mechanism and an indicator, each of which is provided with a series of characters, one of said series having a step-by-step progressive movement relatively to the other.

2. A code or cipher writing mechanism, having typing mechanism including printing characters and relative actuating means, and an adjustable indicator provided with a series of indicating characters having a step-by-step progressive movement relatively to the actuating means.

3. A code or cipher writing machine, having typing mechanism including printing characters and actuating means having respectively corresponding permanent indicating characters, and an adjustable indicator provided with a series of indicating characters having a step-by-step progressive movement relative to the series of indicating characters on the actuating means.

4. A code or cipher writing mechanism, including a type-writing machine, the keys and type of which are in constant relation, and a variable alphabet carrying means disposed for a step-by-step progressive movement relatively to the keys, the alphabet thereof being disposed for registration with the keys, and an operable connection between the last means and the keys, whereby the keys are actuated according to the disposition of the letter of the variable alphabet carrying means to produce a code or cipher symbol.

In testimony that I claim the foregoing as my own, I have hereto affixed my signature in the presence of two witnesses.

SYDNEY T. MARYE.

Witnesses:
C. E. DOYLE,
C. E. PREINTEERT.